United States Patent [19]
Young

[11] Patent Number: 6,081,196
[45] Date of Patent: Jun. 27, 2000

[54] APPARATUS AND METHOD FOR MULTIPURPOSE RESIDENTIAL WATER FLOW FIRE ALARM

[76] Inventor: Richard Jack Young, 9709 Winding Oaks Dr., Oklahoma City, Okla. 73151

[21] Appl. No.: 09/098,976

[22] Filed: Jun. 17, 1998

[51] Int. Cl.[7] .................................................. G08B 21/00
[52] U.S. Cl. ........................ 340/606; 340/609; 340/611; 73/197; 73/861.77
[58] Field of Search ................................. 340/606, 608, 340/609, 610, 611, 577; 137/62, 80, 460, 119.06; 73/861.52, 861.61, 197, 198, 861.77

[56] References Cited

U.S. PATENT DOCUMENTS

| | | |
|---|---|---|
| 3,876,009 | 4/1975 | Johnson . |
| 4,791,414 | 12/1988 | Griess . |
| 5,085,076 | 2/1992 | Engelmann ................................ 73/197 |
| 5,139,044 | 8/1992 | Otten et al. ................................ 137/80 |
| 5,228,469 | 7/1993 | Otten et al. ................................ 137/80 |
| 5,236,002 | 8/1993 | Martin et al. . |
| 5,483,838 | 1/1996 | Holden ................................ 73/861.61 |
| 5,546,801 | 8/1996 | Swinson . |

OTHER PUBLICATIONS

Residential Domestic Shutoff Valve, Automatic (marketing brochure) 1993.

*Primary Examiner*—Jeffery A. Hofsass
*Assistant Examiner*—Van T. Trieu
*Attorney, Agent, or Firm*—Edward L. White

[57] ABSTRACT

A multipurpose residential plumbing and fire sprinkler system or, more simply, a multipurpose piping system ("MPS") is a system for providing water to both domestic uses (e.g., showers, sinks, toilets) and to sprinklers for fire protection. The invention provides an apparatus and method for alarming when one or more sprinklers connected to the MPS are activated by a fire. The invention uses a water flow detector. In particular, the invention provides an apparatus and method for distinguishing typical domestic water flow from the flow caused by one or more sprinkler heads.

5 Claims, 2 Drawing Sheets

APPARATUS AND METHOD FOR MULTIPURPOSE RESIDENTIAL WATER FLOW FIRE ALARM

BACKGROUND OF THE INVENTION

1. Field of the Invention

The invention relates to the field of multi-purpose residential plumbing and fire sprinkler systems. A multi-purpose residential plumbing and fire sprinkler system or, more simply, a multipurpose piping system ("MPS") is a system for providing water to both domestic uses (e.g., showers, sinks, toilets) and to sprinklers for fire protection. The invention provides an apparatus and method for alarming when one or more sprinklers connected to the MPS are activated by a fire. In particular, the invention provides an apparatus and method for distinguishing typical domestic water flow from the flow caused by one or more sprinkler heads.

2. Description of the Prior Art

The National Fire Protection Association ("NFPA") has established standards for the design and operation of multi-purpose residential fire sprinkler systems. The standard is known as NFPA 13D, 1996 Ed. It defines a multipurpose piping system as "[a] piping system within dwellings and manufactured homes intended to serve both domestic and fire protection needs."

Typical commercial fire sprinkler systems utilize a water flow detector to provide an alarm means. When a flow of sufficient volume is detected, typical commercial systems indicate an alarm condition. The only reason that water typically flows in commercial systems is activation of a sprinkler head. Therefore, in a typical commercial system an alarm means need only determine whether or not water is flowing.

In an MPS water regularly flows through the common piping. Flows occur to supply domestic needs within the residence. Whenever a sink, shower or toilet valve open, water flows in the MPS. Therefore, the alarm system used on typical commercial applications will not work for MPS because simply taking a shower would cause a typical commercial flow detector to alarm when used with an MPS.

In light of this problem, typical residential applications have two completely different piping systems: (1) a fire sprinkler piping system, and (2) a domestic piping system. This basically doubles the number of pipes and the amount of plumbing work which has to be performed in a typical residential application. The same set of piping cannot be used for both systems because the flow alarm would send false signals every time domestic water was turned on. Alternatively, a residential application could use a fire detection system (i.e., electronic fire sensor system). However, a fire detection system does not alarm when water flows. Therefore, with a fire detection system and no flow alarm, the fire sprinklers could run for days, causing extensive water damage, while the home owner is away on vacation and no alarm would sound.

SUMMARY OF THE INVENTION

It is an object of the invention to provide an apparatus and method for alarming MPS which overcome as one or more of the disadvantages of the prior systems. In particular, it is an object of the invention to provide an apparatus and method for alarming an MPS using a flow-based method of creating an alarm condition. A related object is to provide an apparatus and method for alarming MPS which reduces the cost for installation of new systems by allowing common piping to be used for both domestic and fire sprinkler system needs. A further object of the invention is to provide an apparatus and method for alarming MPS which allows for retrofits of existing domestic plumbing systems to allow installation of fire sprinkler systems. Another object of the invention is to provide an apparatus and method for alarming MPS which is able to distinguish domestic water flow from minimum fire protection water flows. Another object of the invention is to provide an apparatus which can shut off flows to major domestic uses if an alarm condition is detected.

Accordingly, the invention provides a supply side for delivering a specified flow of water under pressure, an MPS having both a system side in common piping for delivering water to a fire side attached to one or more sprinkler heads and to a domestic side for delivering water to one or more domestic uses, a drain/test connection disposed between the supply side and the system side for draining water from the system side and for simulating the flow rates which occur when a sprinkler head is activated by a fire; and a means for detecting the flow of water caused by operation of one or more sprinkler heads and for distinguishing that flow from the flow of water needed to supply the domestic needs of the residence. A related method is disclosed for calibrating the apparatus to alarm when a minimum fire protection flow rate is detected, but to not alarm when only domestic flows are detected. Preferably there is also a means for numerically displaying the flow rate detected by the detecting means. It is further preferred that a pressure gauge be present adjacent to the detecting means, so that in combination the detecting means and the pressure gauge are capable of determining whether sufficient water supply is present to supply fire sprinkler system needs. An alternative embodiment means provided for cutting off major domestic water uses and/or a sprinkler system in the case of an alarm detected or created by the apparatus. The apparatus and method disclosed herein allow for more economical installation of multi-purpose residential plumbing and fire sprinkler systems. The fact these systems are more economical using the invention disclosed makes it more likely that such systems will be installed in new homes. The invention also makes it possible to retrofit existing residential systems with a fire sprinkler system.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

DESCRIPTION OF THE PREFERRED EMBODIMENT

The preferred embodiment of the present invention can best be understood when compared to the prior art. Thus, the prior art will first be discussed, and then the elements of the invention which differ from the prior art will be highlighted. While the invention will be described in connection with a preferred embodiment, it will be understood that it is not intended to limit the invention to that embodiment.

Figure 1:
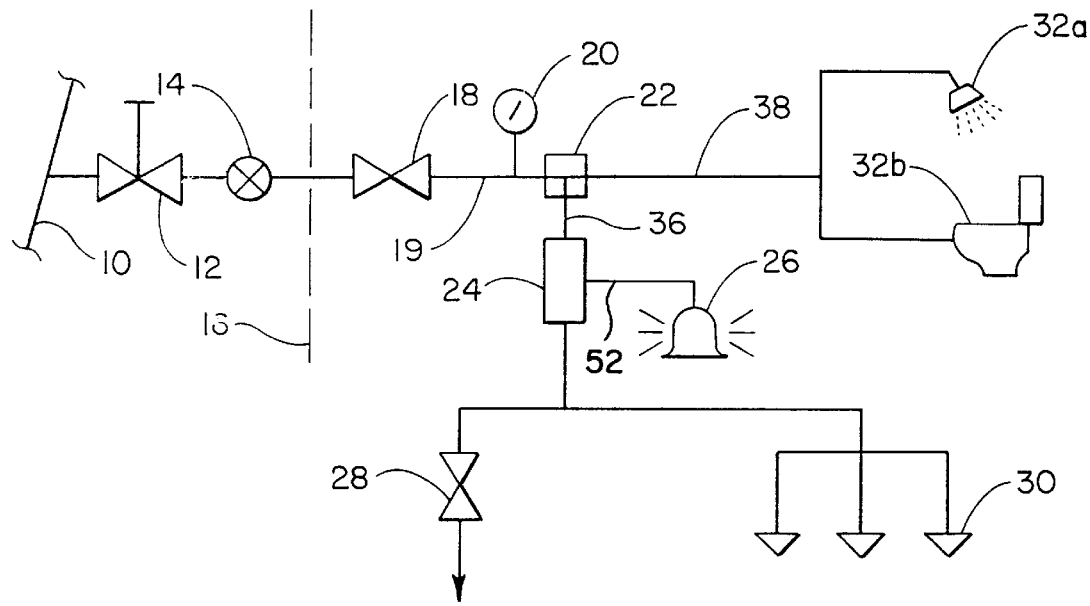
FIG. 1 is an illustration of a typical NFPA 13D sprinkler system.

A typical NFPA 13D system is illustrated by FIG. 1. City water or other supply means 10 are connected to a supply system leading into the house. Water first flows through an outside gate valve 12. The valve 12 is typically integrally connected with a water meter 14, though the two parts may be completely separate. After flowing through the valve 12 and meter 14 the water passes the exterior wall 16 of the residence. A main control valve 18 is provided in case it becomes necessary to shut off all the water in the house. Though shown inside the residence the main control valve 18 may also be outside of the residence. A pressure gauge 20 is commonly provided to monitor water pressure in the system. A flow splitter 22 divides the water supply into two distinct streams: (a) a fire side 36, and (b) a domestic side 38. Following the flow splitter a flow detection means 24 is provided on the fire side 36. The flow detection means is coupled to an alarm means 26. Upon detection of flow by the flow detection means 24, a signal is sent to the alarm means 26, which creates an alarm condition therein. Piping leads away from the flow detection means to a drain/test connection 28. The drain/test connection serves two purposes: it allows the fire side 36 to be drained, and it allows for simulation of the flow rate created by the operation of a sprinkler head 30. Piping also leads away from the flow detection means 24 to at least one sprinkler head 30. A separate set of piping, the domestic side 38, leads to one or more domestic uses 32.

It is known that domestic uses of water can have a high enough flow rate to detract from fire protection needs. Therefore, the prior art also discloses a domestic water supply shut-off valve, which is effectively incorporated into the flow splitter 22 for shutting off water supply to the domestic side 38. Such a shut-off valve is illustrated by U.S. Pat. No. 5,236,002 to Martin. et al., and incorporated herein by reference. A typical NFPA 13D system requires two complete sets of piping, both fire side piping 36 and domestic piping 38 to be run throughout the house. These two pipes running side by side require substantial increased material and labor costs to install. Further, for an existing structure, it may be extremely expensive or even impossible to install the second set of piping required for a fire sprinkler system. Given these two problems of additional costs, and the problem with retrofits, a multi-purpose system was envisioned by the NFPA. However, the NFPA provides no means for alarming upon a water flow condition in an MPS.

Figure 2:
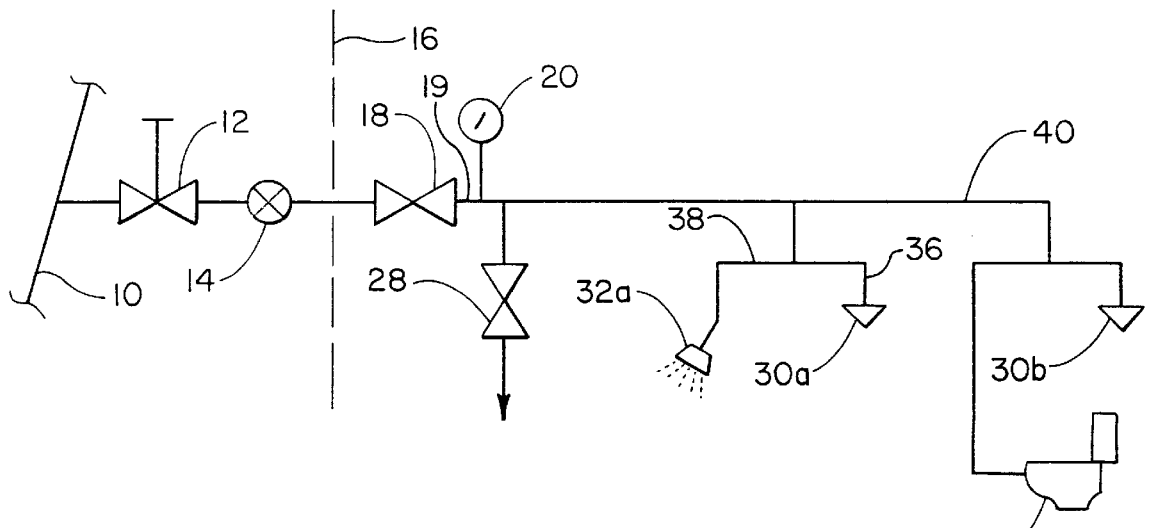
FIG. 2 is a prior multi-purpose system, which has no way to alarm.

FIG. 2 illustrates the prior MPS. Again, a city or other domestic water supply 10 is provided. The water flows through the outside gate valve 12 and water meter 14 through the outer wall 16 of the residence. Thence the water flows through the main control valve 18. A pressure gauge 20 is typically provided to monitor water pressure in the system. No flow splitter 22 (shown in FIG. 1) is required for an MPS. A drain test connection 28 is still provided, but there is no flow detection means 24. As noted above, typical flow detection means 24 alarm upon detection of a minimum flow. Therefore, given the common piping system 40 in the MPS, typical domestic uses would cause the prior art flow detection means to send an alarm signal to the alarm means 26. NFPA 72 provided for installation of a non-water-flow-based fire detection and alarm system for use with MPS. These non-water-flow-based fire detection and alarm systems are expensive, and they are not capable of detecting flow through one or more fire protection sprinklers. The inability of a fire detection system to detect and enunciate a water flow alarm could result in extensive water damage to the property.

Figure 3:
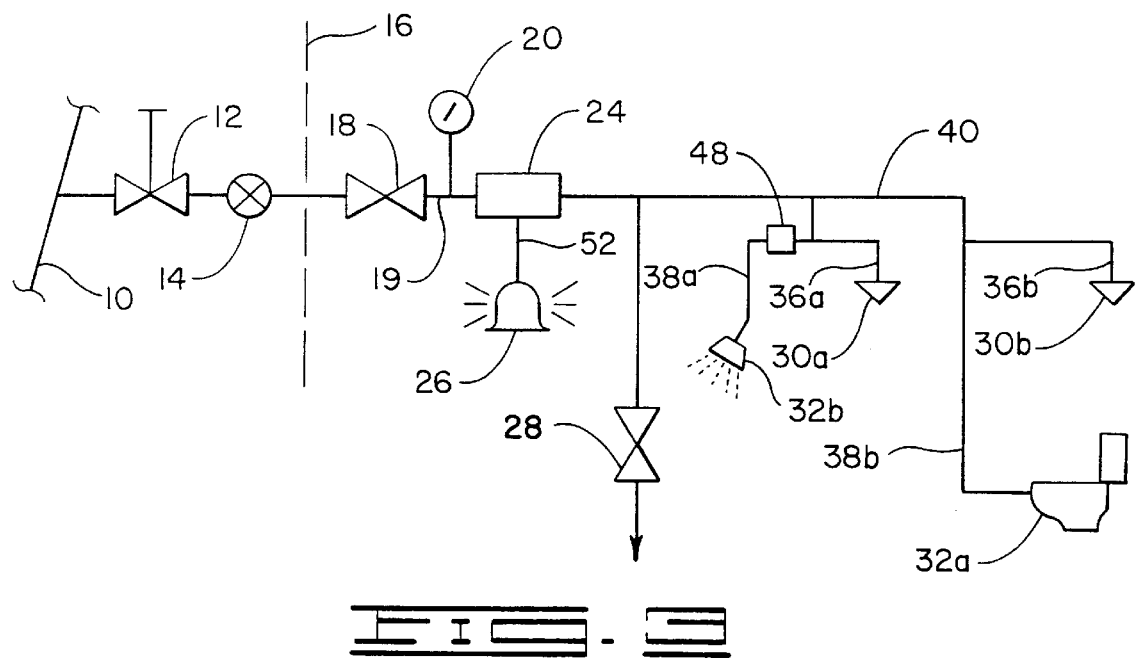
FIG. 3 illustrates the present invention.

FIG. 3 illustrates the present invention. Again a city/domestic water supply 10 is provided. The water flows through the city or outside gate valve 12 through the water meter 14 and past the outer wall 16 of the residence. Once inside the house it passes through a main control valve 18. As with the prior art multi-purpose residential system described in FIG. 2, common piping 40, carries water throughout the system. After passing through the main control valve 18, water passes by a pressure gauge 20, then through a flow detection means 24. In combination the flow detection means 24 and the pressure gauge 20 allow for determination of whether the water supply is sufficient for fire protection needs. The flow detection means is connected to an alarm means which is activated upon the detection of a flow rate greater than maximum domestic flow. Methods of detecting and measuring flow and alarming upon excessive flow are illustrated, for example, in Otten, et al., U.S. Pat. No. 5,228,469, incorporated herein by reference. Disposed after the detection means is a drain test connection 28. This drain test connection 28 serves the same purpose as it did in the prior art (See FIG. 1). The drain test connection 28 may include a venturi device with interchangeable orifice plates for simulating different flow regimes. For example, one orifice plate could simulate the operation of a single fire sprinkler while another orifice plate simulated the domestic usage. These interchangeable orifice plates could then be used to calibrate the operation of the alarm means. Common piping 40 carries water throughout the system to both domestic 32 and fire protection 30 uses. Rather than having distinct fire sides 36 and domestic sides 38, the invention has short sections of pipe split off from the common piping 40 which are designated as either fire side 36 or domestic side 38.

A means of determining the domestic and fire protection flows will be through the establishment of a "K" values for each. For each flow, the maximum volumetric flow "Q" (usually measured in gallons per minute) is divided by the square root of the pressure "P" (usually measured in pounds per square inch). Thus the formula is as follows:

$$K = \frac{Q}{\sqrt{P}}$$

The greater the "K" value, the greater the flow at any pressure. Typical fire protection "K" values are 4.3 or greater while typical domestic "K" values are 3.3 or less. Thus, the invention takes advantage of the difference in "K" values to distinguish domestic from fire protection flows. The prior art does not anticipate nor suggest that the differing flows for domestic and fire protection uses, as represented by K values, could be used as the basis for a flow-based fire protection alarm.

Figure 4:
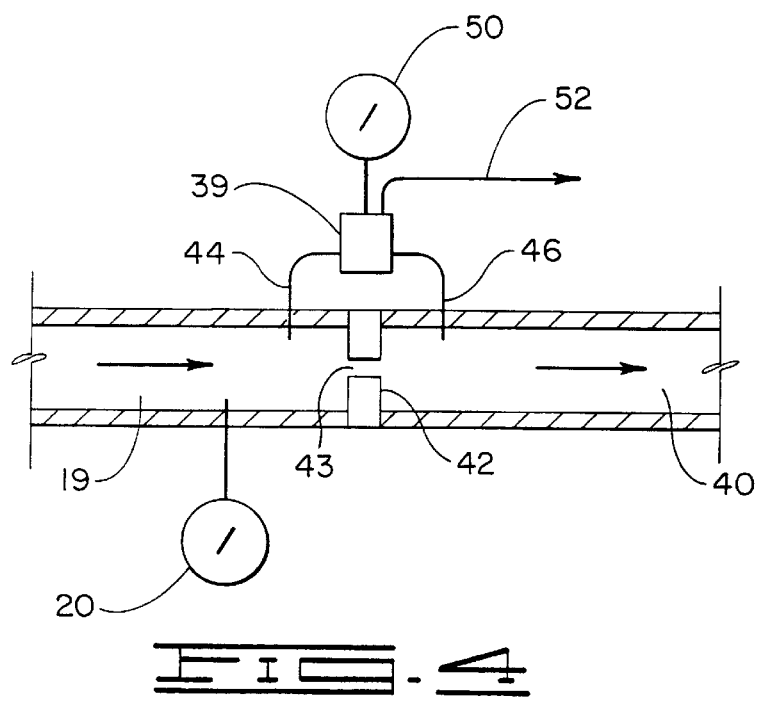
FIG. 4 is a detail of a differential pressure flow detection means.

The flow detection means 24 could utilize any number of well known flow measurement technologies. See, e.g., Otten et al., U.S. Pat. No. 5,228,469, and Holden, U.S. Pat. No. 5,483,383. FIG. 4 illustrates an orifice plate flow detection system. An orifice plate in the common piping will create a differential pressure which is proportional to the flow rate through the pipe. The orifice plate 42 is disposed within the common piping 40. An upstream pressure sampling port 44 and a down stream pressure sampling port 46 are connected to a differential pressure switch 48. The differential pressure between the upstream sampling port 44 and down stream sampling port 46 is proportional to the flow rate through the common piping 40. The pressure indicated by the differential pressure switch 48 corresponds to a flow rate which can be displayed on an appropriate gauge or digital readout 50. An alarm output 52 is connected to the alarm mechanism 26 for creating an alarm condition when the flow rate indicated by the differential pressure exceeds some preset value. The drain/test connection could also employ an orifice plate device, preferably accepting interchangeable orifice plates, to simulate the domestic and fire protection demands. The flow could also be measured by a multitude of devices commercially available for detection of flow rate including mass flow meters, pitot tubes, momentum-base flow meters and a multitude of other systems. The type of flow meter used is not critical to the invention, so long as it is capable of creating an electrical, pneumatic, or other appropriate alarm output 43 which can be connected to an alarm means for creation of an alarm condition when a fire protection flow is detected.

Preferably, the system includes a static pressure meter 54. Applicable standards specify a minimum volumetric flow rate at a specified residual pressure. In combination, the flow detection means and the static pressure meter 54 enable determination of whether the water flow rate through the system is sufficient to supply fire protection flow rates.

To reiterate, the problem to be solved by the present invention is provision of a water-flow-based means of alarming an MPS. In the past, such systems had to utilize two completely different piping systems: one for domestic uses and one for fire sprinkler system uses. Previous alarms used in these systems were designed to create an alarm condition upon the detection of a flow (commonly 10 gpm). Typical domestic flows would have caused an alarm in a prior art system. Alternatively, prior art systems used a fire detection and alarm system which did not have a flow detector. These systems without a flow detector risked substantial water damage to the structure if a sprinkler head activated while no one was in the home.

The present system is based on the principle that domestic flow rates are much lower than flow rates needed for fire protection. Using a flow detection means 24, it is possible to create an alarm condition only upon detection of flows which are such as created by fire protection needs. Thus, an alarm condition is not created when typical domestic uses only are detected.

OPERATION

In operation the apparatus functions as both a domestic water supply system and a fire detection and alarm system. Under normal conditions, the water flow rate through the flow detection means 24 does not reach the fire suppression flow rates. When one or more sprinkler heads 30 activate, the flow detection means 24 detects the increased flow and sends an alarm to the alarm means 26. The alarm means 26 enunciates a visible or audible alarm indicating the alarm condition. It is well known in the prior art to activate a telephone modem-based system for calling, for example, the fire department, upon detection of an alarm condition. See, e.g., Otten, U.S. Pat. No. 5,139,044. It will be preferable to incorporate such a modem-based component in the present invention to notify the fire department and other emergency contacts should an alarm condition be detected. If one or more domestic cutoff valves 48 are included in the apparatus, the flow detection means 24 also sends a signal to activate the domestic cutoff valves, shutting off water to one or more domestic uses 23.

The method for calibrating the apparatus includes the following steps: (1) opening the drain/test connection to simulate a minimum fire protection flow rate caused by the operation of one sprinkler head; (2) setting the flow detection means 24 to create an alarm output when a flow rate just below the minimum fire protection flow rate is detected by the detecting means; (3) insuring that an alarm condition is created when a minimum fire protection flow rate is detected by opening the drain/test connection 28 and checking for an alarm condition; and (4) insuring that an alarm condition is not created with maximum domestic flow by simulating the maximum expected domestic flow, then checking for an alarm condition. As noted, the drain/test connection 28 can be adapted to receive different orifice plates to simulate different flow regimes. Preferably, there would be one orifice plate to simulate minimum fire protection flow and a second orifice plate to simulate maximum expected domestic flow. Where the drain/test connection 28 accepts interchangeable orifice plates, the calibration of the flow detecction means 24 is greatly simplified. An operator simply inserts an orifice plate for simulating fire protection flow, then calibrates the flow detection means 24 to enunciate an alarm at a slightly lower flow rate. The operator then ensures that an alarm condition is created at the fire protection flow rate. Next, the operator replaces the orifice plate designed to simulate minimum fire protection flows with one designed to simulate maximum domestic flow. Finally, the drain/test connection 28 is again opened to ensure that an alarm condition is not created at maximum domestic flow rates.

While the invention has been shown, illustrated, described and disclosed in terms of embodiments or modifications which it is assumed, the scope of the invention should not be deemed to be limited by the precise embodiment or modification therein shown, illustrated, described or disclosed. Such other embodiments or modifications are intended to be reserved especially as they fall within the scope of the claims herein appended.

What I claim is:

1. An apparatus for use as a multipurpose residential fire suppression and water flow alarm system comprising:
   a. a supply side for delivering a specified flow of water under pressure;
   b. a multipurpose piping system having a system side with common piping for delivering water from the supply side to—(i) a fire suppression side with one or more sprinkler heads, and (ii) a domestic side for delivering water to one or more domestic uses;
   c. a detecting means for detecting a fire protection flow and for distinguishing that flow from a maximum domestic flow, the detecting means being disposed between the supply side and the system side;
   d. a drain/test connection disposed between the detecting means and the system side for draining water from the system side and for simulating desired flow rates; and
   e. an alarm means, in communication with the detecting means, for enunciating an alarm upon detection by the detecting means of a fire protection flow.

2. A method of fire protection for a residence, the steps of the method comprising:
   a. providing the apparatus of claim 1;
   b. opening the drain/test connection to simulate a fire protection flow rate;
   c. setting the flow detecting means to create an alarm output when a flow rate just below the fire protection flow rate is detected;
   d. opening the drain/test connection to simulate fire protection flow and insuring that an alarm condition is created, and, if not, raising the detecting means setting until an alarm condition is created; and
   e. opening the drain/test connection to simulate the maximum domestic flow, then insuring that an alarm condition is not created;
   f. if an alarm condition is created by maximum domestic flow, raising the setting on the flow detection means and repeating the step "d".

3. The apparatus of claim 1 wherein the flow detecting means comprises an orifice plate through which water flows causing a differential pressure measured by a differential pressure switch, so that the flow rate through the orifice plate is proportional to the differential pressure, allowing the detecting means to determine the flow rate based on the differential pressure.

4. The apparatus of claim 1 where a residual pressure gauge is disposed between the detection means and the drain/test connection, so that during a test of the flow rate, it can be determined using the pressure indicated on the status pressure gauge and the flow rate indicated by the flow detecting means whether the water supply is sufficient to satisfy fire protection needs.

5. The apparatus of claim 1 where the drain test connection is an orifice plate device capable of accepting interchangeable orifice plates to simulate either the domestic or fire protection flow.

* * * * *